Patented July 15, 1930

1,770,573

UNITED STATES PATENT OFFICE

OLAV HAAVARDSHOLM, OF OSLO, NORWAY

GELATIN PRODUCT AND THE PROCESS FOR MANUFACTURING SAME

No Drawing. Application filed June 30, 1928, Serial No. 289,617, and in Germany and Norway May 7, 1928.

My invention relates to gelatin and more especially to gelatin used in the household. Gelatin for domestic use is to-day usually sold in granulated or powdered form, while in earlier days it was practically without exception marketed in plates, which of course were less soluble in water and required a more expensive and voluminous packing, and furthermore easily became soiled from dust and handling.

In the household, however, the old time plate gelatin had the advantage of being easily portioned in the exact amount required for a given dish, while the granulated gelatin requires some kind of measuring device in order to obtain the exact amount wanted. And as the solution can not be tasted as to its strength, as for instance with sugar or salt solutions, a dish otherwise perfect may be spoiled due to too much or too little gelatin. This point, of course, is a drawback with regard to the granulated or powdered gelatin.

The object of my invention is to eliminate this drawback with regard to granulated gelatin, and I do this by forming said gelatin in cubes or tablets.

To produce tablets or cubes from powdered gelatin is a very easy matter. This, however, is not the real problem. By compressing powdered gelatin in any manner, one will obtain tablets which will either very soon go to pieces again or be so hard that it is impossible to get them back again into a state of powdered form or to dissolve them in warm water.

Gelatin tablets may be formed without applying pressure for instance by moistening the powder and forming it in suitable layers, which can be divided into tablets or cubes. These will when dry have the necessary consistency. When tearing or breaking these tablets into pieces, however, one will not get a powder similar to the starting material, but a powder consisting of large and small grains which can only slowly be dissolved in water.

Neither can, when producing gelatin tablets, a binding material be added to the basic material, as gelatin must dissolve into a perfectly clear fluid.

I have found that a gelatin tablet may be produced which has the desired properties and without elaborate arrangements. I do this by compressing gelatin powder into tablets under a pressure which is in a definite relation to the temperature and the degree of moisture in the tablets.

If a pressure of 20–30 thousand lbs. per sq. inch is used in the process of producing the tablets, this pressure alone will increase the temperature. If the powder is fed into the forming machine at a temperature of 75° F. and exposed to a pressure as mentioned, then the tablets will acquire the desired properties, under the condition that the powder has not through the (previous) heating lost part of its moisture, i. e., the heating must not be done under the influence of dry air. A preferable procedure is to store powdered gelatin in a container or room, having a degree of moisture of about 60–70%, this degree of moisture also being maintained in the room where the machine is working. When using a pressure as stated and temperatures of about 70–80° F. (of the powder as well as of the air), it is then possible to obtain a product of the properties desired without any difficulties.

The tablets may after completion for a short time be subjected to the influence of wet steam, whereafter they are rapidly dried. If, however, the steaming lasts too long, the tablet's ability to be dissolved readily in water will be ruined.

Claims:—

1. The process of manufacturing gelatin tablets from granulated or pulverized gelatin, said tablets having the capacity of easily breaking up into crumbs, consisting in exposing granulated or pulverized gelatin which has been stored in air, having a degree of moisture of about 60–70% and a temperature of 70–80° F. to a pressure of from 20–30 thousand lbs. per sq. inch.

2. In the process claimed in claim 1 the additional step consisting in finally subjecting the tablets to the influence of wet steam a short while and thereafter rapidly drying the same.

In testimony whereof I have signed my name unto this specification.

OLAV HAAVARDSHOLM.